US010171389B2

United States Patent
Banerjee et al.

(10) Patent No.: US 10,171,389 B2
(45) Date of Patent: *Jan. 1, 2019

(54) GENERATING POLL INFORMATION FROM A CHAT SESSION

(71) Applicant: International Business Machines Corporation, Armonk, NY (US)

(72) Inventors: Prithu Banerjee, Bangalore (IN); William G. O'Keeffe, Tewksbury, MA (US); David D. Taieb, Charlestown, MA (US); Srikanth G. Tamilselvam, Chennai (IN)

(73) Assignee: International Business Machines Corporation, Armonk, NY (US)

( * ) Notice: Subject to any disclaimer, the term of this patent is extended or adjusted under 35 U.S.C. 154(b) by 362 days.

This patent is subject to a terminal disclaimer.

(21) Appl. No.: 14/862,568

(22) Filed: Sep. 23, 2015

(65) Prior Publication Data

US 2017/0063745 A1   Mar. 2, 2017

Related U.S. Application Data

(63) Continuation of application No. 14/843,473, filed on Sep. 2, 2015.

(51) Int. Cl.
  *H04L 12/58* (2006.01)
  *G06F 3/0484* (2013.01)
  *G06Q 30/00* (2012.01)

(52) U.S. Cl.
  CPC ........ *H04L 51/046* (2013.01); *G06F 3/04842* (2013.01); *G06Q 30/00* (2013.01); *H04L 51/16* (2013.01); *H04L 51/18* (2013.01)

(58) Field of Classification Search
  CPC ............................... H04L 51/16; H04L 51/18
  USPC ........................................................ 709/205
  See application file for complete search history.

(56) References Cited

U.S. PATENT DOCUMENTS

| 8,473,553 | B2 | 6/2013 | McDevitt et al. |
| 8,560,567 | B2 | 10/2013 | Azzam et al. |
| 2006/0090137 | A1 | 4/2006 | Cheng et al. |
| 2007/0099162 | A1* | 5/2007 | Sekhar ............... G06Q 30/02 434/323 |
| 2009/0287678 | A1 | 11/2009 | Brown et al. |
| 2010/0023586 | A1 | 1/2010 | Bauchot et al. |

(Continued)

OTHER PUBLICATIONS

List of IBM Patents or Patent Applications Treated as Related dated Sep. 23, 2015, 2 pages.

(Continued)

*Primary Examiner* — Wing F Chan
*Assistant Examiner* — Leon Y Tseng
(74) *Attorney, Agent, or Firm* — Stephen R. Tkacs; Stephen J. Walder, Jr.; Diana R. Gerhardt (57) ABSTRACT

A mechanism is provided in a data processing system for generating poll information from a chat session. The mechanism monitors chat content in the multiple user chat session. The mechanism identifies a poll question in a message within the chat content. The mechanism identifies a plurality of answers to the poll question in subsequent messages within the chat content. The mechanism generates a poll user interface presenting the poll question and the plurality of answers as selectable options and presents the poll user interface to the multiple users of the chat session.

10 Claims, 6 Drawing Sheets

(56) References Cited

U.S. PATENT DOCUMENTS

| | | |
|---|---|---|
| 2011/0066587 A1 | 3/2011 | Ferrucci et al. |
| 2011/0125734 A1 | 5/2011 | Duboue et al. |
| 2012/0240062 A1* | 9/2012 | Passmore ................ H04L 51/32 |
| | | 715/758 |
| 2013/0007055 A1 | 1/2013 | Brown et al. |
| 2013/0018652 A1 | 1/2013 | Ferrucci et al. |
| 2013/0066886 A1 | 3/2013 | Bagchi et al. |
| 2014/0120513 A1* | 5/2014 | Jenkins ................... G06F 17/27 |
| | | 434/362 |
| 2015/0044659 A1 | 2/2015 | Basu et al. |
| 2016/0217170 A1* | 7/2016 | Andescavage .... G06F 17/30345 |

OTHER PUBLICATIONS

High, Rob, "The Era of Cognitive Systems: An Inside Look at IBM Watson and How it Works", IBM Corporation, Redbooks, Dec. 12, 2012, 16 pages.

McCord, M.C. et al., "Deep parsing in Watson", IBM J. Res. & Dev. vol. 56 No. 3/4 Paper 3, May/Jul. 2012, pp. 3:1-3:15.

Yuan, Michael J., "Watson and healthcare, How natural language processing and semantic search could revolutionize clinical decision support", IBM developerWorks, IBM Corporation, Apr. 12, 2011, 14 pages.

* cited by examiner

User1> User2, do you think we should delay delivery of Project X?
User2> No, we can make the deadline
User1> User3, do you agree?
User3> Yep, we can make it
User1> Ok

FIG. 5B

Do you think we should delay delivery of Project X?
No: 100% (2 of 2 responses)
Yes: 0% (0 of 2 resposnes)

Do you think we should delay delivery of Project X?
No: 100% (2 of 2 responses)
Yes: 0% (0 of 2 responses)
Vote: Yes  No
See Results

FIG. 5D

User1> I think we should delay delivery of Project X a month. What do you think?
User2> No, we can make the deadline
User3> I think we need to delay 6 weeks to be fully tested
User4> I agree with User3. It's better to be sure we can deliver it fully tested.

FIG. 5E

By how many weeks should we delay Project X?
6 weeks: 50% (2 votes)
4 weeks: 25% (1 vote)
0 weeks: 25% (1 vote)
Vote: -2------3------8 weeks
See Results

FIG. 5F

User1> User2, what are some of the modules for delivery of Project X?
User2> Authentication, Logging
User1> User3, do you agree?
User3> Yep
User4> We also agreed on sentiment aggregation on temporal aspects, new aggregation formulae, etc...
User1> Oh Ok

FIG. 5G

User1> User2, do you think we should delay delivery of Project X?
User3> No, we can make the deadline
User2> Yep, we need to delay it.

FIG. 5H

User1> User2, do you think we should delay delivery of Project X?
User2> Hmm, User3 would know better than me
User3> Yep, we can make it
User2> I'm not so sure
User1> Ok

FIG. 5I

User1> I propose that we delay delivery of Project X a month. What do you think?
User2> No, we can make the deadline.
User3> I think we might need to delay 6 weeks to be fully tested
User4> I don't really know, maybe 4 or 5 weeks?

FIG. 5J

By how many weeks should we delay Project X?
6 weeks: 50% (2 votes)
4 weeks: 25% (1 vote)
0 weeks: 25% (1 vote)
Vote: 2------5------8 weeks
See Results

*FIG. 6*

User1: I think we should delay delivery of Project X a month. What do you think?
User2: No, we can make the deadline
User3: I think we need to delay 6 weeks to be fully tested
User4: I agree with User3. It's better to be sure we can deliver it fully tested.

[ Send ]

Auto Poll                                            Disable ☐

By how long should we delay Project X?
6 weeks: 50% (2 votes)
4 weeks: 25% (1 vote)
0 weeks: 25% (1 vote)
Vote: ←————————□————————→
      -2 weeks      3 weeks      8 weeks See Result Details ▢ 6 weeks
▣ 4 weeks
▨ 0 weeks Change Graph Format

*FIG. 7*

GENERATING POLL INFORMATION FROM A CHAT SESSION

BACKGROUND

The present application relates generally to an improved data processing apparatus and method and more specifically to mechanisms for generating poll information from a chat session.

Online chat refers to any kind of communication over the Internet that offers a real-time transmission of text messages from senders to receivers. Chat messages are generally short in order to enable other participants to respond quickly. Thereby, a feeling similar to a spoken conversation is created, which distinguishes chatting from other text-based online communication forms such as Internet forums and email. Online chat addresses point-to-point communications as well as multicast communications from one sender to many receivers and voice and video chat, or may be a feature of a web conferencing service.

Online chat in a less stringent definition may be primarily any direct text-based or video-based chat, using tools such as instant messengers, Internet Relay Chat (IRC), talkers, and possibly multi-user dungeons (MUDs). The expression "online chat" comes from the word "chat," which means "informal conversation." Online chat includes web-based applications that allow communication—often directly addressed, but anonymous between users in a multi-user environment. Web conferencing is a more specific online service, that is often sold as a service, hosted on a web server controlled by the vendor.

Chat systems, also referred to as dialog systems, play a key role in functioning of organizations with many critical decisions made using chat systems. One key feature that is critical to decision making is participant voting. Though online systems are available that have sophisticated methods to invite users, vote, share files, generate charts, etc., users must explicitly specify a poll question and potential answers. Another disadvantage of existing chat system tools is the need to move away from the chat system to vote or generate metrics.

SUMMARY

In one illustrative embodiment, a method, in a data processing system, is provided for generating poll information from a chat session. The method comprises monitoring, by the data processing system, chat content in the multiple user chat session. The method further comprises identifying, by the data processing system, a poll question in a message within the chat content. The method further comprises identifying, by the data processing system, a plurality of answers to the poll question in subsequent messages within the chat content. The method further comprises generating, by the data processing system, a poll user interface presenting the poll question and the plurality of answers as selectable options. The method further comprises presenting, by the data processing system, the poll user interface to the multiple users of the chat session.

In other illustrative embodiments, a computer program product comprising a computer useable or readable medium having a computer readable program is provided. The computer readable program, when executed on a computing device, causes the computing device to perform various ones of, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones of, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE DRAWINGS

The invention, as well as a preferred mode of use and further objectives and advantages thereof, will best be understood by reference to the following detailed description of illustrative embodiments when read in conjunction with the accompanying drawings, wherein.

DETAILED DESCRIPTION

The illustrative embodiments provide mechanisms for generating poll information from a chat. A mechanism of the illustrative embodiments monitors an n-way chat session between multiple users. The mechanism identifies questions that are asked to the group. The mechanism then identifies answers to that question that are given by other users in the chat session. The mechanism correlates the questions and provided answers to show group consensus on the given question.

A mechanism of the illustrative embodiments allows users to change their answers or vote on the poll via an automatically generated polling user interface. The mechanism selects questions/answers for automatic polling by identifying questions that have a finite number of answers. This allows the users to stay in the conversation and still see the polling/voting information in real time.

Providing the polling user interface within the chat clarifies the outcome for all participants. If a user disagrees with the poll results or a particular answer in the poll, then the user can voice that concern immediately within the chat session. The mechanisms of the illustrative embodiment may continuously monitor the chat session, expand or adjust the poll answers, and dynamically update the poll results.

Before beginning the discussion of the various aspects of the illustrative embodiments in more detail, it should first be appreciated that throughout this description the term "mechanism" will be used to refer to elements of the present invention that perform various operations, functions, and the like. A "mechanism," as the term is used herein, may be an implementation of the functions or aspects of the illustrative embodiments in the form of an apparatus, a procedure, or a computer program product. In the case of a procedure, the procedure is implemented by one or more devices, apparatus, computers, data processing systems, or the like. In the case of a computer program product, the logic represented by computer code or instructions embodied in or on the computer program product is executed by one or more hardware devices in order to implement the functionality or perform the operations associated with the specific "mechanism." Thus, the mechanisms described herein may be implemented as specialized hardware, software executing on general purpose hardware, software instructions stored on a medium such that the instructions are readily executable by specialized or general purpose hardware, a procedure or method for executing the functions, or a combination of any of the above.

The present description and claims may make use of the terms "a", "at least one of", and "one or more of" with regard to particular features and elements of the illustrative embodiments. It should be appreciated that these terms and phrases are intended to state that there is at least one of the particular feature or element present in the particular illustrative embodiment, but that more than one can also be present. That is, these terms/phrases are not intended to limit the description or claims to a single feature/element being present or require that a plurality of such features/elements be present. To the contrary, these terms/phrases only require at least a single feature/element with the possibility of a plurality of such features/elements being within the scope of the description and claims.

In addition, it should be appreciated that the following description uses a plurality of various examples for various elements of the illustrative embodiments to further illustrate example implementations of the illustrative embodiments and to aid in the understanding of the mechanisms of the illustrative embodiments. These examples intended to be non-limiting and are not exhaustive of the various possibilities for implementing the mechanisms of the illustrative embodiments. It will be apparent to those of ordinary skill in the art in view of the present description that there are many other alternative implementations for these various elements that may be utilized in addition to, or in replacement of, the examples provided herein without departing from the spirit and scope of the present invention.

Figure 1:
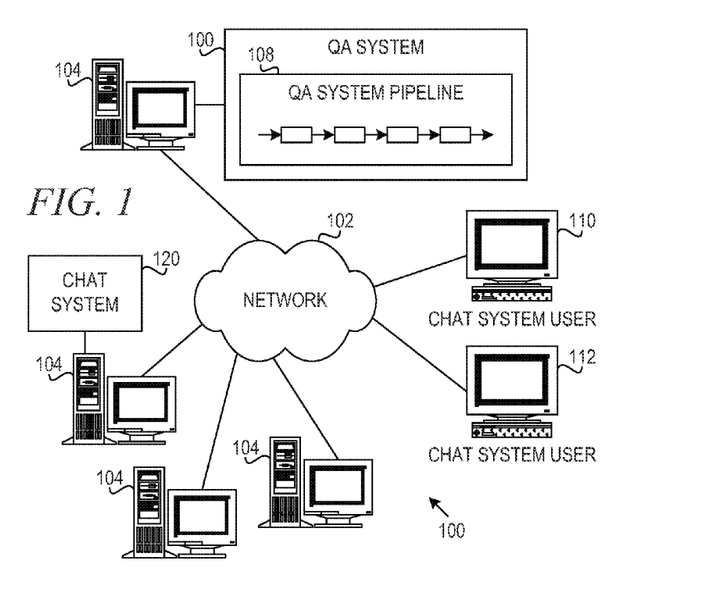
FIG. 1 depicts a schematic diagram of one illustrative embodiment of a chat system using functionality of a question/answer creation (QA) system in a computer network in accordance with an illustrative embodiment.
Figure 2:
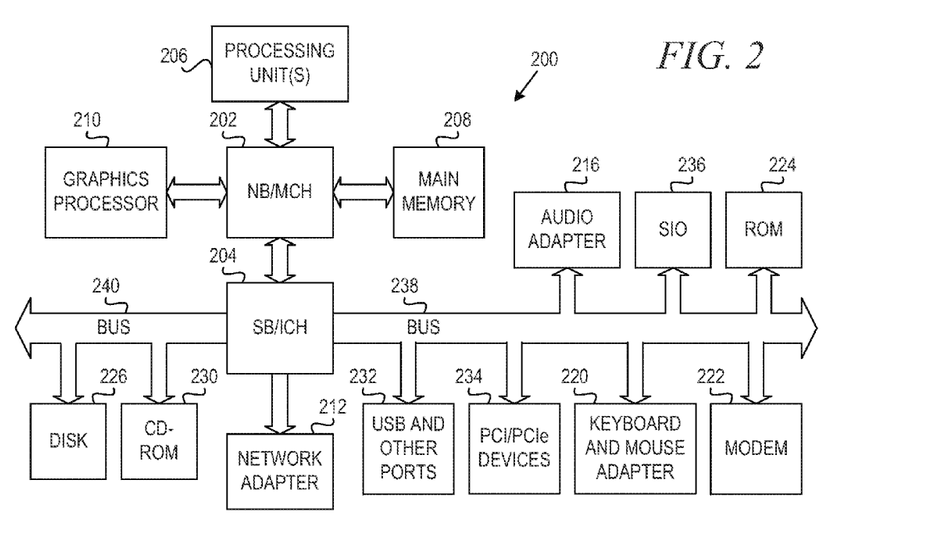
FIG. 2 is a block diagram of an example data processing system in which aspects of the illustrative embodiments are implemented.
Figure 3:
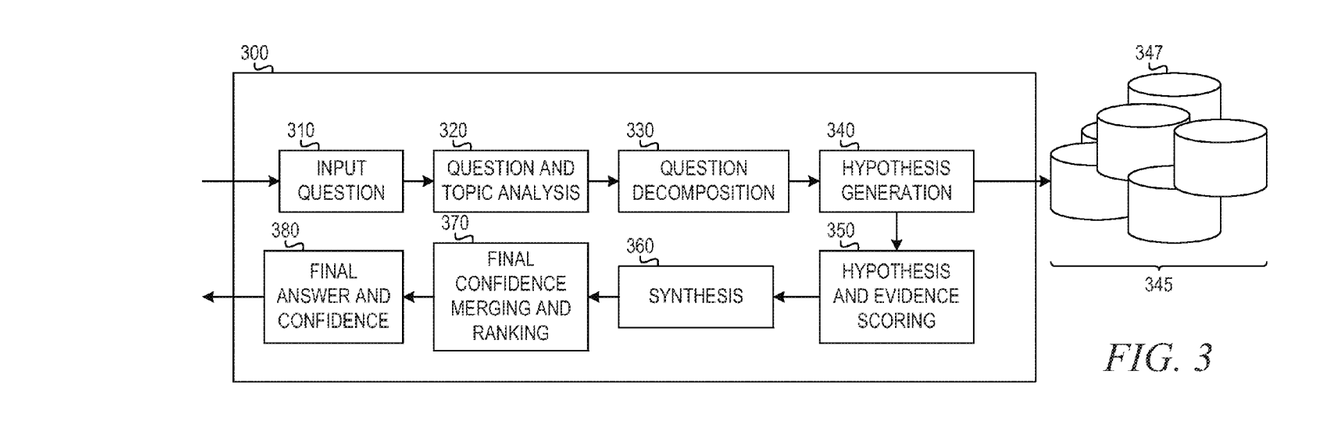
FIG. 3 illustrates a QA system pipeline for processing an input question in accordance with one illustrative embodiment.

The illustrative embodiments may be utilized in many different types of data processing environments. In order to provide a context for the description of the specific elements and functionality of the illustrative embodiments, FIGS. 1-3 are provided hereafter as example environments in which aspects of the illustrative embodiments may be implemented. It should be appreciated that FIGS. 1-3 are only examples and are not intended to assert or imply any limitation with regard to the environments in which aspects or embodiments of the present invention may be implemented. Many modifications to the depicted environments may be made without departing from the spirit and scope of the present invention.

FIGS. 1-3 are directed to describing an example Question Answering (QA) system (also referred to as a Question/Answer system or Question and Answer system), methodology, and computer program product with which the mechanisms of the illustrative embodiments are implemented. As will be discussed in greater detail hereafter, the illustrative embodiments use the functionality of these QA mechanisms with regard to generating poll information in a chat session.

Thus, it is important to first have an understanding of how question and answer creation in a QA system is implemented before describing how the mechanisms of the illustrative embodiments make use of such QA systems. It should be appreciated that the QA mechanisms described in FIGS. 1-3 are only examples and are not intended to state or imply any limitation with regard to the type of QA mechanisms with which the illustrative embodiments are implemented. Many modifications to the example QA system shown in FIGS. 1-3 may be implemented in various embodiments of the present invention without departing from the spirit and scope of the present invention.

As an overview, a Question Answering system (QA system) is an artificial intelligence application executing on data processing hardware that answers questions pertaining to a given subject-matter domain presented in natural language. The QA system receives inputs from various sources including input over a network, a corpus of electronic documents or other data, data from a content creator, information from one or more content users, and other such inputs from other possible sources of input. Data storage devices store the corpus of data. A content creator creates content in a document for use as part of a corpus of data with the QA system. The document may include any file, text, article, or source of data for use in the QA system. For example, a QA system accesses a body of knowledge about the domain, or subject matter area, e.g., financial domain, medical domain, legal domain, etc., where the body of knowledge (knowledgebase) can be organized in a variety of configurations, e.g., a structured repository of domain-specific information, such as ontologies, or unstructured data related to the domain, or a collection of natural language documents about the domain.

Content users input questions to the QA system, which then answers the input questions using the content in the corpus of data by evaluating documents, sections of documents, portions of data in the corpus, or the like. When a process evaluates a given section of a document for semantic content, the process can use a variety of conventions to query such document from the QA system, e.g., sending the query to the QA system as a well-formed question which are then interpreted by the QA system and a response is provided containing one or more answers to the question. Semantic content is content based on the relation between signifiers, such as words, phrases, signs, and symbols, and what they stand for, their denotation, or connotation. In other words, semantic content is content that interprets an expression, such as by using Natural Language Processing.

As will be described in greater detail hereafter, the QA system receives an input question, parses the question to extract the major features of the question, uses the extracted features to formulate queries, and then applies those queries to the corpus of data. Based on the application of the queries to the corpus of data, the QA system generates a set of hypotheses, or candidate answers to the input question, by looking across the corpus of data for portions of the corpus of data that have some potential for containing a valuable response to the input question. The QA system then performs deep analysis on the language of the input question and the language used in each of the portions of the corpus of data found during the application of the queries using a variety of reasoning algorithms. There may be hundreds or even thousands of reasoning algorithms applied, each of which performs different analysis, e.g., comparisons, natural language analysis, lexical analysis, or the like, and generates a score. For example, some reasoning algorithms may look at the matching of terms and synonyms within the language of the input question and the found portions of the corpus of data. Other reasoning algorithms may look at temporal or spatial features in the language, while others may evaluate the source of the portion of the corpus of data and evaluate its veracity.

The scores obtained from the various reasoning algorithms indicate the extent to which the potential response is inferred by the input question based on the specific area of focus of that reasoning algorithm. Each resulting score is then weighted against a statistical model. The statistical model captures how well the reasoning algorithm performed at establishing the inference between two similar passages for a particular domain during the training period of the QA system. The statistical model is used to summarize a level of confidence that the QA system has regarding the evidence that the potential response, i.e. candidate answer, is inferred by the question. This process is repeated for each of the candidate answers until the QA system identifies candidate answers that surface as being significantly stronger than others and thus, generates a final answer, or ranked set of answers, for the input question.

As mentioned above, QA systems and mechanisms operate by accessing information from a corpus of data or information (also referred to as a corpus of content), analyzing it, and then generating answer results based on the analysis of this data. Accessing information from a corpus of data typically includes: a database query that answers questions about what is in a collection of structured records, and a search that delivers a collection of document links in response to a query against a collection of unstructured data (text, markup language, etc.). Conventional question answering systems are capable of generating answers based on the corpus of data and the input question, verifying answers to a collection of questions for the corpus of data, correcting errors in digital text using a corpus of data, and selecting answers to questions from a pool of potential answers, i.e. candidate answers.

FIG. 1 depicts a schematic diagram of one illustrative embodiment of a chat system 120 using functionality of a question/answer creation (QA) system 100 in a computer network 102. One example of a question/answer generation which may be used in conjunction with the principles described herein is described in U.S. Patent Application Publication No. 2011/0125734, which is herein incorporated by reference in its entirety. The QA system 100 and chat system 120 are implemented on one or more computing devices 104 (comprising one or more processors and one or more memories, and potentially any other computing device elements generally known in the art including buses, storage devices, communication interfaces, and the like) connected to the computer network 102. The network 102 includes multiple computing devices 104 in communication with each other and with other devices or components via one or more wired and/or wireless data communication links, where each communication link comprises one or more of wires, routers, switches, transmitters, receivers, or the like. The QA system 100, chat system 120, and network 102 enable question/answer (QA) identification functionality for one or more chat system users via their respective computing devices 110-112. Other embodiments of the chat system 120 may be used with components, systems, sub-systems, and/or devices other than those that are depicted herein.

The QA system 100 is configured to implement a QA system pipeline 108 that receive inputs from various sources. For example, the QA system 100 receives input from the network 102, chat system 120, and/or other data and other possible sources of input. In one embodiment, some or all of the inputs to the QA system 100 are routed through the network 102. The various computing devices 104 on the network 102 include access points for chat system users. The network 102 includes local network connections and remote connections in various embodiments, such that the QA system 100 and chat system 120 may operate in environments of any size, including local and global, e.g., the Internet.

In one embodiment, the questions are formed using natural language. The QA system 100 parses and interprets the content of a chat session on chat system 120 to identify questions and potential answers to an identified question. In some embodiments, the QA system 100 identifies a question in the chat session as a suitable poll question and classifies identified answers as votes in the poll.

In one embodiment, QA system 100 identifies whether content of a chat session includes a question based on punctuation (i.e., a question mark) or by sentence structure. QA system 100 identifies a suitable poll question by determining that the lexical answer type (LAT) of the question is such that there are a finite number of distinct or mutually exclusive answers. In addition, QA system 100 identifies responses in the chat session that include potential answers to an identified poll question. In one embodiment, QA system 100 considers each response as a hypothesis or candidate answer and determines a confidence score for the candidate answer, as will described in further detail below.

The QA system 100 implements a QA system pipeline 108 which comprises a plurality of stages for processing content of a chat session of chat system 120. The QA system pipeline 108 identifies a poll question and potential answers based on the processing of messages in the chat session. The QA system pipeline 108 is described in greater detail hereafter with regard to FIG. 3.

In some illustrative embodiments, the QA system 100 may be the IBM Watson™ QA system available from International Business Machines Corporation of Armonk, N.Y., which is augmented with the mechanisms of the illustrative embodiments described hereafter. The IBM Watson™ QA system performs deep analysis on the language of the chat session using a variety of reasoning algorithms. The scores obtained from the various reasoning algorithms are then weighted against a statistical model that summarizes a level of confidence that the IBM Watson™ QA system has regarding the evidence that the potential response, i.e. candidate answer, is inferred by the question. This process is repeated for each of the candidate answers to generate ranked listing of candidate answers which may then be used to generate a poll or to determine poll results. More information about the IBM Watson™ QA system may be obtained, for example, from the IBM Corporation website, IBM Redbooks, and the like. For example, information about the IBM Watson™ QA system can be found in Yuan et al., "Watson and Healthcare," IBM developerWorks, 2011 and "The Era of Cognitive Systems: An Inside Look at IBM Watson and How it Works" by Rob High, IBM Redbooks, 2012.

In accordance with an illustrative embodiment, chat system users at clients 110, 112 submit messages to chat system 120, which communicates with QA system 100. One or more reasoning algorithms or stages of QA system pipeline 108 identify poll questions and potential answers (votes) to generate a poll and determine poll results. The mechanisms of the illustrative embodiments present the poll question and selectable answers, as well as poll results, in the chat user interface of chat system 120. The mechanisms of the illustrative embodiment may present the poll and/or poll results inline in the chat session or as a persistent user interface component of the overall chat user interface in association with the chat session.

FIG. 2 is a block diagram of an example data processing system in which aspects of the illustrative embodiments are implemented. Data processing system 200 is an example of a computer, such as server 104 or client 110 in FIG. 1, in which computer usable code or instructions implementing the processes for illustrative embodiments of the present invention are located. In one illustrative embodiment, FIG. 2 represents a server computing device, such as a server 104, which, which implements chat system 120 and/or QA system 100 with QA system pipeline 108 augmented to include the additional mechanisms of the illustrative embodiments described hereafter.

In the depicted example, data processing system 200 employs a hub architecture including north bridge and memory controller hub (NB/MCH) 202 and south bridge and input/output (I/O) controller hub (SB/ICH) 204. Processing unit 206, main memory 208, and graphics processor 210 are connected to NB/MCH 202. Graphics processor 210 is connected to NB/MCH 202 through an accelerated graphics port (AGP).

In the depicted example, local area network (LAN) adapter 212 connects to SB/ICH 204. Audio adapter 216, keyboard and mouse adapter 220, modem 222, read only memory (ROM) 224, hard disk drive (HDD) 226, CD-ROM drive 230, universal serial bus (USB) ports and other communication ports 232, and PCI/PCIe devices 234 connect to SB/ICH 204 through bus 238 and bus 240. PCI/PCIe devices may include, for example, Ethernet adapters, add-in cards, and PC cards for notebook computers. PCI uses a card bus controller, while PCIe does not. ROM 224 may be, for example, a flash basic input/output system (BIOS).

HDD 226 and CD-ROM drive 230 connect to SB/ICH 204 through bus 240. HDD 226 and CD-ROM drive 230 may use, for example, an integrated drive electronics (IDE) or serial advanced technology attachment (SATA) interface. Super I/O (SIO) device 236 is connected to SB/ICH 204.

An operating system runs on processing unit 206. The operating system coordinates and provides control of various components within the data processing system 200 in FIG. 2. As a client, the operating system is a commercially available operating system such as Microsoft® Windows 8®. An object-oriented programming system, such as the Java™ programming system, may run in conjunction with the operating system and provides calls to the operating system from Java™ programs or applications executing on data processing system 200.

As a server, data processing system 200 may be, for example, an IBM® eServer™ System p® computer system, running the Advanced Interactive Executive (AIX®) operating system or the LINUX® operating system. Data processing system 200 may be a symmetric multiprocessor (SMP) system including a plurality of processors in processing unit 206. Alternatively, a single processor system may be employed.

Instructions for the operating system, the object-oriented programming system, and applications or programs are located on storage devices, such as HDD 226, and are loaded into main memory 208 for execution by processing unit 206. The processes for illustrative embodiments of the present invention are performed by processing unit 206 using computer usable program code, which is located in a memory such as, for example, main memory 208, ROM 224, or in one or more peripheral devices 226 and 230, for example.

A bus system, such as bus 238 or bus 240 as shown in FIG. 2, is comprised of one or more buses. Of course, the bus system may be implemented using any type of communication fabric or architecture that provides for a transfer of data between different components or devices attached to the fabric or architecture. A communication unit, such as modem 222 or network adapter 212 of FIG. 2, includes one or more devices used to transmit and receive data. A memory may be, for example, main memory 208, ROM 224, or a cache such as found in NB/MCH 202 in FIG. 2.

Those of ordinary skill in the art will appreciate that the hardware depicted in FIGS. 1 and 2 may vary depending on the implementation. Other internal hardware or peripheral devices, such as flash memory, equivalent non-volatile memory, or optical disk drives and the like, may be used in addition to or in place of the hardware depicted in FIGS. 1 and 2. Also, the processes of the illustrative embodiments may be applied to a multiprocessor data processing system, other than the SMP system mentioned previously, without departing from the spirit and scope of the present invention.

Moreover, the data processing system 200 may take the form of any of a number of different data processing systems including client computing devices, server computing devices, a tablet computer, laptop computer, telephone or other communication device, a personal digital assistant (PDA), or the like. In some illustrative examples, data processing system 200 may be a portable computing device that is configured with flash memory to provide non-volatile memory for storing operating system files and/or user-generated data, for example. Essentially, data processing system 200 may be any known or later developed data processing system without architectural limitation.

FIG. 3 illustrates a QA system pipeline for processing an input question in accordance with one illustrative embodiment. The QA system pipeline of FIG. 3 may be implemented, for example, as QA system pipeline 108 of QA system 100 in FIG. 1. It should be appreciated that the stages of the QA system pipeline shown in FIG. 3 are implemented as one or more software engines, components, or the like, which are configured with logic for implementing the functionality attributed to the particular stage. Each stage is implemented using one or more of such software engines, components or the like. The software engines, components, etc. are executed on one or more processors of one or more data processing systems or devices and utilize or operate on data stored in one or more data storage devices, memories, or the like, on one or more of the data processing systems. The QA system pipeline of FIG. 3 is augmented, for example, in one or more of the stages to implement the improved mechanism of the illustrative embodiments described hereafter, additional stages may be provided to implement the improved mechanism, or separate logic from the pipeline 300 may be provided for interfacing with the pipeline 300 and implementing the improved functionality and operations of the illustrative embodiments.

As shown in FIG. 3, the QA system pipeline 300 comprises a plurality of stages 310-380 through which the QA system operates to analyze an input question and generate a final response. In an initial question input stage 310, the QA system receives an input question that is presented in a natural language format. That is, a user inputs, via a user interface, an input question for which the user wishes to obtain an answer, e.g., "Who are Washington's closest advisors?" In response to receiving the input question, the next stage of the QA system pipeline 300, i.e. the question and topic analysis stage 320, parses the input question using natural language processing (NLP) techniques to extract major features from the input question, and classify the major features according to types, e.g., names, dates, or any of a plethora of other defined topics. For example, in the example question above, the term "who" may be associated with a topic for "persons" indicating that the identity of a person is being sought, "Washington" may be identified as a proper name of a person with which the question is associated, "closest" may be identified as a word indicative of proximity or relationship, and "advisors" may be indicative of a noun or other language topic.

In addition, the extracted major features include key words and phrases classified into question characteristics, such as the focus of the question, the lexical answer type (LAT) of the question, and the like. As referred to herein, a lexical answer type (LAT) is a word in, or a word inferred from, the input question that indicates the type of the answer, independent of assigning semantics to that word. For example, in the question "What maneuver was invented in the 1500s to speed up the game and involves two pieces of the same color?" the LAT is the string "maneuver." The focus of a question is the part of the question that, if replaced by the answer, makes the question a standalone statement. For example, in the question "What drug has been shown to relieve the symptoms of ADD with relatively few side effects?" the focus is "drug," because if "what drug" were replaced with the answer, e.g., "Adderall," then a standalone statement results, e.g., "Adderall has been shown to relieve the symptoms of ADD with relatively few side effects." The focus often, but not always, contains the LAT. On the other hand, in many cases it is not possible to infer a meaningful LAT from the focus.

Referring again to FIG. 3, the identified major features are then used during the question decomposition stage 330 to decompose the question into one or more queries that are applied to the corpora of data/information 345 in order to generate one or more hypotheses. The queries are generated in any known or later developed query language, such as the Structure Query Language (SQL), or the like. The queries are applied to one or more databases storing information about the electronic texts, documents, articles, websites, and the like, that make up the corpora of data/information 345. That is, these various sources themselves, different collections of sources, and the like, represent a different corpus 347 within the corpora 345. There may be different corpora 347 defined for different collections of documents based on various criteria depending upon the particular implementation. For example, different corpora may be established for different topics, subject matter categories, sources of information, or the like. As one example, a first corpus may be associated with healthcare documents while a second corpus may be associated with financial documents. Alternatively, one corpus may be documents published by the U.S. Department of Energy while another corpus may be IBM Redbooks documents. Any collection of content having some similar attribute may be considered to be a corpus 347 within the corpora 345.

The queries are applied to one or more databases storing information about the electronic texts, documents, articles, websites, and the like, that make up the corpus of data/information. The queries are applied to the corpus of data/information at the hypothesis generation stage 340 to generate results identifying potential hypotheses for answering the input question, which can then be evaluated. That is, the application of the queries results in the extraction of portions of the corpus of data/information matching the criteria of the particular query. These portions of the corpus are then analyzed and used, during the hypothesis generation stage 340, to generate hypotheses for answering the input question. These hypotheses are also referred to herein as "candidate answers" for the input question. For any input question, at this stage 340, there may be hundreds of hypotheses or candidate answers generated that may need to be evaluated.

The QA system pipeline 300, in stage 350, then performs a deep analysis and comparison of the language of the input question and the language of each hypothesis or "candidate answer," as well as performs evidence scoring to evaluate the likelihood that the particular hypothesis is a correct answer for the input question. As mentioned above, this involves using a plurality of reasoning algorithms, each performing a separate type of analysis of the language of the input question and/or content of the corpus that provides evidence in support of, or not in support of, the hypothesis. Each reasoning algorithm generates a score based on the analysis it performs which indicates a measure of relevance of the individual portions of the corpus of data/information extracted by application of the queries as well as a measure of the correctness of the corresponding hypothesis, i.e. a measure of confidence in the hypothesis. There are various ways of generating such scores depending upon the particular analysis being performed. In generally, however, these algorithms look for particular terms, phrases, or patterns of text that are indicative of terms, phrases, or patterns of interest and determine a degree of matching with higher degrees of matching being given relatively higher scores than lower degrees of matching.

Thus, for example, an algorithm may be configured to look for the exact term from an input question or synonyms to that term in the input question, e.g., the exact term or synonyms for the term "movie," and generate a score based on a frequency of use of these exact terms or synonyms. In such a case, exact matches will be given the highest scores, while synonyms may be given lower scores based on a relative ranking of the synonyms as may be specified by a subject matter expert (person with knowledge of the particular domain and terminology used) or automatically determined from frequency of use of the synonym in the corpus corresponding to the domain. Thus, for example, an exact match of the term "movie" in content of the corpus (also referred to as evidence, or evidence passages) is given a highest score. A synonym of movie, such as "motion picture" may be given a lower score but still higher than a synonym of the type "film" or "moving picture show." Instances of the exact matches and synonyms for each evidence passage may be compiled and used in a quantitative function to generate a score for the degree of matching of the evidence passage to the input question.

Thus, for example, a hypothesis or candidate answer to the input question of "What was the first movie?" is "The Horse in Motion." If the evidence passage contains the statements "The first motion picture ever made was 'The Horse in Motion' in 1878 by Eadweard Muybridge. It was a movie of a horse running," and the algorithm is looking for exact matches or synonyms to the focus of the input question, i.e. "movie," then an exact match of "movie" is found in the second sentence of the evidence passage and a highly scored synonym to "movie," i.e. "motion picture," is found in the first sentence of the evidence passage. This may be combined with further analysis of the evidence passage to identify that the text of the candidate answer is present in the evidence passage as well, i.e. "The Horse in Motion." These factors may be combined to give this evidence passage a relatively high score as supporting evidence for the candidate answer "The Horse in Motion" being a correct answer.

It should be appreciated that this is just one simple example of how scoring can be performed. Many other algorithms of various complexity may be used to generate scores for candidate answers and evidence without departing from the spirit and scope of the present invention.

In the synthesis stage 360, the large number of scores generated by the various reasoning algorithms are synthesized into confidence scores or confidence measures for the various hypotheses. This process involves applying weights to the various scores, where the weights have been determined through training of the statistical model employed by the QA system and/or dynamically updated. For example, the weights for scores generated by algorithms that identify exactly matching terms and synonym may be set relatively higher than other algorithms that are evaluating publication dates for evidence passages. The weights themselves may be specified by subject matter experts or learned through machine learning processes that evaluate the significance of characteristics evidence passages and their relative importance to overall candidate answer generation.

The weighted scores are processed in accordance with a statistical model generated through training of the QA system that identifies a manner by which these scores may be combined to generate a confidence score or measure for the individual hypotheses or candidate answers. This confidence score or measure summarizes the level of confidence that the QA system has about the evidence that the candidate answer is inferred by the input question, i.e. that the candidate answer is the correct answer for the input question.

The resulting confidence scores or measures are processed by a final confidence merging and ranking stage 370 which compares the confidence scores and measures to each other, compares them against predetermined thresholds, or performs any other analysis on the confidence scores to determine which hypotheses/candidate answers are the most likely to be the correct answer to the input question. The hypotheses/candidate answers are ranked according to these comparisons to generate a ranked listing of hypotheses/candidate answers (hereafter simply referred to as "candidate answers"). From the ranked listing of candidate answers, at stage 380, a final answer and confidence score, or final set of candidate answers and confidence scores, are generated and output to the submitter of the original input question via a graphical user interface or other mechanism for outputting information.

Final confidence merging and ranking stage 370 includes reasoning algorithms for integrating authority of document sources. In one embodiment, a filtering mechanism uses authority scores to determine the likelihood that the source contains the correct answer. The mechanism uses a predetermined threshold to allow or not allow an answer through to additional pipeline processing. In one example embodiment, the mechanism filters answers based on document source authority before running resource intensive deep scorers. For example, the filtering mechanism may exist in hypotheses generation stage 340.

In accordance with the illustrative embodiments, the reasoning algorithms, software engines, components, etc. of question and topic analysis stage 320 analyze each message in a chat session to determine if the message contains a suitable poll question. In one embodiment, question and topic analysis stage 320 examines syntactic and semantic structure of each message to determine whether the message forms a question. In addition, question and topic analysis stage 320 determines whether a question is of a type that is suitable to be a poll question. For example, questions that have a finite number of distinct answers may be potential poll questions, while questions that have only one answer (e.g., "Who invented the light bulb?") or ask for a list of elements (e.g., "What ingredients go into making bread?") are not suitable poll questions. Similarly, questions about future events (e.g., "Who will win the next election?") make suitable poll questions, while questions about past events (e.g., "Who won the last election?") may not. As another example, a poll question may ask for the sentiment of other users, using phrases such as "do you think" or "in your opinion."

In the illustrative embodiments, hypotheses generation stage 340 considers each message subsequent to a poll question as a candidate answer to the poll question. Hypothesis and evidence scoring stage 350 then determines a confidence that the message is an answer to the question.

Mechanisms of the illustrative embodiments associate an identified poll question with poll answers in a chat session. The mechanisms generate a poll for the identified poll question using the candidate answers from the chat session as selectable answers for the poll. The mechanisms count each chat message from a distinct user containing an answer to the poll question as a vote in the poll. The mechanisms then generate poll results based on chat system user votes.

Figure 4:
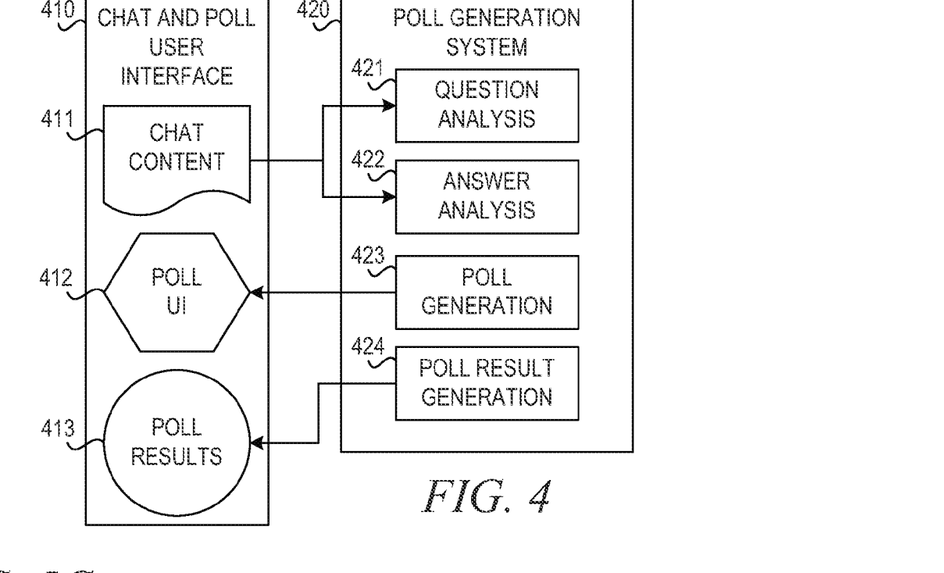
FIG. 4 is a block diagram of a mechanism for generating poll information from a chat session in accordance with an illustrative embodiment.

FIG. 4 is a block diagram of a mechanism for generating poll information from a chat session in accordance with an illustrative embodiment. Poll generation system 420 communicates with chat and poll user interface 410. Chat system users interact with chat and poll user interface 410 to view and enter chat messages within a chat session. Chat content 411 includes the chat messages labeled with user identifiers of the users who entered the messages.

Poll generation system 420 comprises question analysis component 421, answer analysis component 422, poll generation component 423, and poll result generation component 424. Question analysis component 421 examines chat content 411 to identify questions and, more particularly, questions that are suitable for a poll. In one embodiment, question analysis component 421 uses reasoning algorithms, software engines, or components of a question answering (QA) system pipeline, such as QA system pipeline 300 in FIG. 3, particularly components of question and topic analysis stage 320. Question analysis component 421 analyzes the punctuation, syntax, and semantic meaning of each message in chat content 411 to determine whether the message contains a potential poll question.

Answer analysis component 422 examines chat content 411 to identify messages that are answers in response to an identified poll question. In one embodiment, answer analysis component 422 uses reasoning algorithms, software engines, or components of a question answering (QA) system pipeline, such as QA system pipeline 300 in FIG. 3, particularly components of hypothesis and evidence scoring stage 350. Answer analysis component 422 examines messages that are subsequent to an identified poll question to determine if the message contains a candidate answer for the identified poll question. In one embodiment, answer analysis component 422 considers a predetermined number of messages following a poll question or for a predetermined period of time. Answer analysis component 422 determines a confidence score for a message representing a probability that the message is an answer to a given poll question. Answer analysis component 422 determines whether the confidence score for each message is greater than a predetermined threshold. Each message with a confidence score greater than the predetermined threshold is a potential answer to the poll question.

Poll generation component 423 associates each poll question with a plurality of potential answers. Poll generation component 423 generates poll user interface (UI) 412 to present the poll to chat system users. Chat and poll user interface 410 may present poll UI 412 in-line within the chat or as a separate user interface component. Poll UI 412 allows chat system users to vote on the poll or change their votes.

Poll result generation component 424 gathers poll results and generates poll results UI 413. Poll results may include votes entered via chat messages and votes entered via poll UI 412. Poll results UI 413 may present the poll results textually or graphically. For example, poll results UI 413 may present the poll results as a bar chart or pie chart.

In one embodiment, poll generation component 423 continuously monitors chat content 411 to identify new poll questions or to expand the answers for a poll question based on new messages in chat content 411. Poll generation component 423 updates poll UI 412 with new poll questions and answer selections. Poll result generation component 424 continuously monitors chat content 411 and poll UI 412 and updates poll results 413.

Figure 5A:
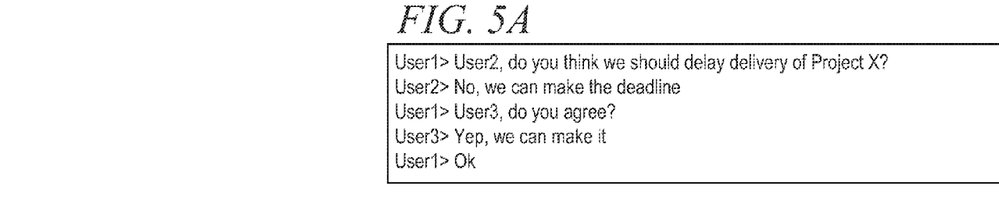
FIGS. 5A-5J depict example chat sessions in accordance with an illustrative embodiment.

FIGS. 5A-5L depict example chat sessions in accordance with an illustrative embodiment. FIG. 5A is an example chat session with three users. In this example, User1 asks a question that is asked to one person only. The system identifies the question and to whom it is directed. The system then identifies a response from User2 with an answer to the question. In one example embodiment, a sentiment engine determines the response type. In this case, the message is a negative response. User1 then asks the opinion of User3. The system maintains conversational context to determine the question was whether User3 agrees with the comment of User2. In the depicted example, User3's response is positive. A positive response to a negative comment equates to a second negative statement in relation to the asked question.

Figure 5B:
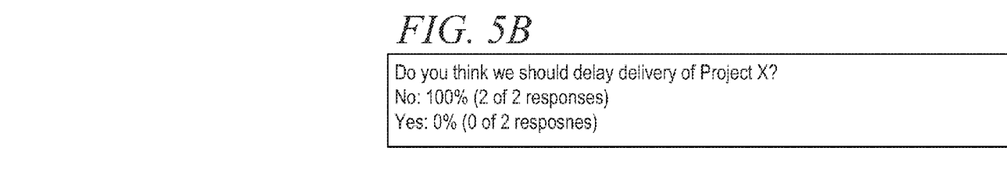
Figure 5C:
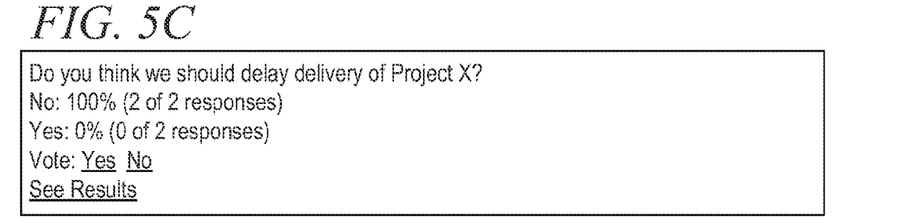

Although there are three users involved in this conversation, only two users contribute to the answer. FIG. 5B is an example of a user interface presenting poll results from the chat session. In this case, the response type for the question is a Boolean (yes or no) response. This establishes the candidate answers for voting. FIG. 5C is an example of a user interface presenting a poll for voting. Now, if more users join the chat, new users can see the question and add their own vote. Existing users can change their vote through the poll user interface. The poll user interface also displays results of who voted in favor and who voted in favor and who voted against. The system may generate graphs or charts from this data to clearly show the poll results. The system may show this user interface within the chat window itself or within another frame of an electronic meeting application or the like. The poll interface may present the votes using hyperlinks, radio buttons, a slider, or the like.

Figure 5D:
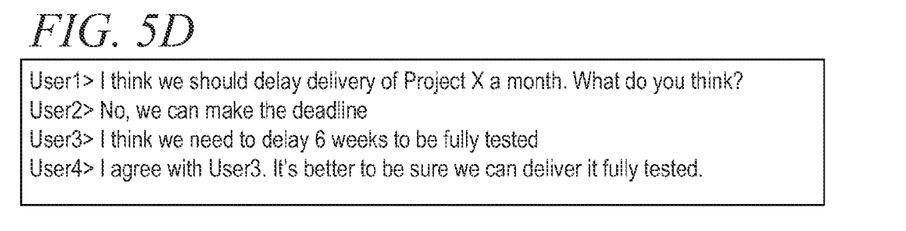

FIG. 5D is an example of a chat session with a different response type. In this example, User1 asks a question and also provides an answer. The question is not directed to any one user, so the system looks for responses from all users. The responses are time based in this example with times in weeks. The system can also convert responses to other units or normalize responses to a common unit. The question and the time based response are candidates for automatic polling. The polling question becomes, "By how many weeks should we delay Project X?" User1 says a month, which may equate to four weeks. User3 says six weeks, and User4 agrees with User3's response of six weeks. User2 responds with a negative response to a delay, which equates to a response of zero weeks.

Figure 5E:
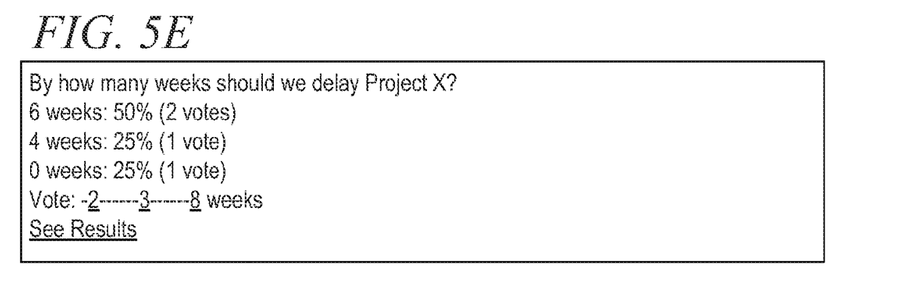

FIG. 5E is an example poll user interface for the chat session of FIG. 5D. In this example, the vote option displays a slider to choose a number of weeks. The range of the slider is determined by the responses already given in the chat session. In this case, the poll UI presents additional weeks before and after the answers given in the chat session.

Figure 5F:
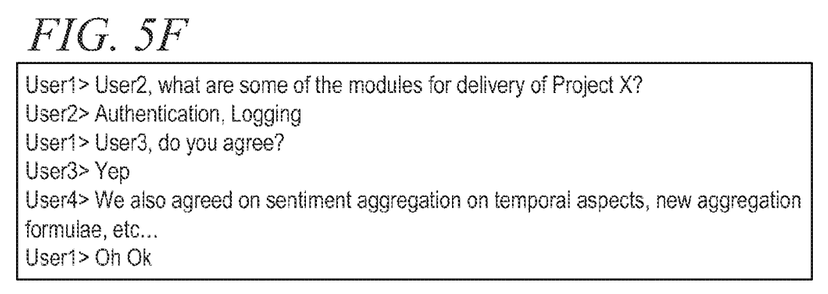

FIG. 5F is an example chat session containing a question that is not suitable for a poll. In this example, the system identifies the questions and answers, but the answers are not easily categorized. They are generally text based and not well defined. The system would not identify this question as being suitable for automatic polling.

Figure 5G:
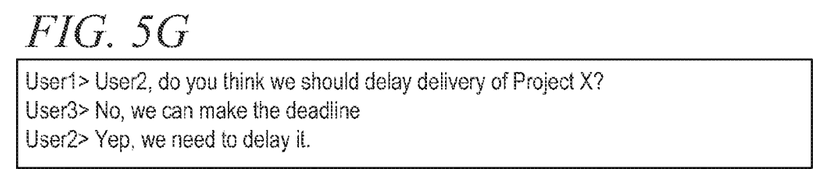

FIG. 5G is an example chat session containing a question for which responses may be weighted. User1 directly asks User2 for an opinion, but User3 responds as well. In this case, the system may count User3's response but weight User2's response higher.

Returning to FIG. 5A, User1 asks User2 directly but also brought User3 into the conversation. Because User1 directed the question to User2 and also to User3, then User3's response counts the same as User2's response.

Figure 5H:
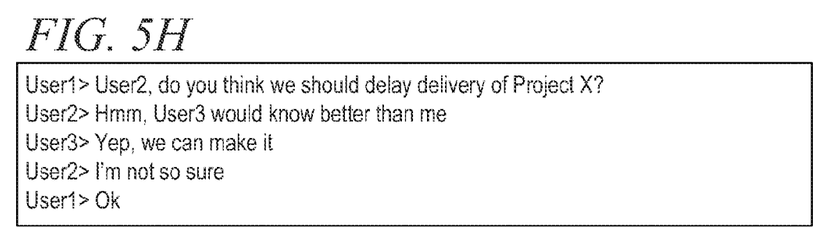

FIG. 5H is an example chat session in which one user defers to another user. In this example, User2 defers to User3; therefore, User3's response is weighted higher than User2's response.

Figure 5I:
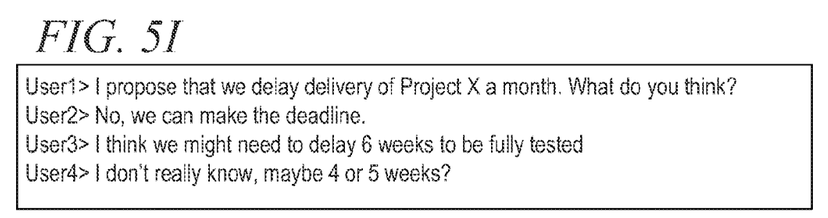

FIG. 5I is an example chat session in which user responses include indicators of user conviction. In this example, User2 responds with a statement of fact. There is no vagueness in the response. User3 "thinks" he or she "might" need to delay, providing evidence of a lack of conviction. In this case, the system may give User3's response a lower weight. User4 explicitly states, "I don't really know," and gives an answer that is a range; therefore, the response of User4 is given even less weight.

Figure 5J:
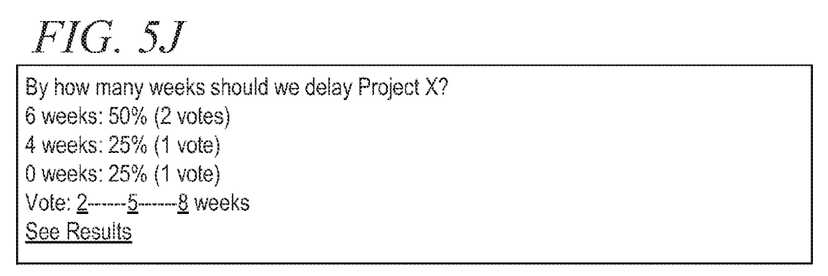

In the weighted examples, the system still generates a voting user interface but also generates a consensus, which takes both answers and weighting into account. FIG. 5J is an example poll user interface for weighted responses. For the response of "5 or 6 weeks." the system uses six weeks as a poll answer because it confirms an opinion of another user. The user can change this selection in the voting user interface afterwards. The consensus would be as follows:

User1: 4 weeks, no vagueness, director of the conversation, opinion counts highly. Weight=1.

User2: 0 weeks, no vagueness, weight=1.

User3: 6 weeks, a little vagueness, weight=0.75.

User4: 5.5 weeks, very vague, weight=0.50. In this example, the system takes the middle of the range given by the user.

The system also counts the weighted average of opinions; therefore, if four weeks is chosen three times, it would count higher than six weeks if it is chosen once. For this example, six weeks is chosen twice, but both times the responses are vague. Six weeks is much closer to the four weeks of User1 than the zero weeks of User2. In this case, the consensus would be four weeks, which does not directly reflect what is given in the voting user interface.

Figure 6:
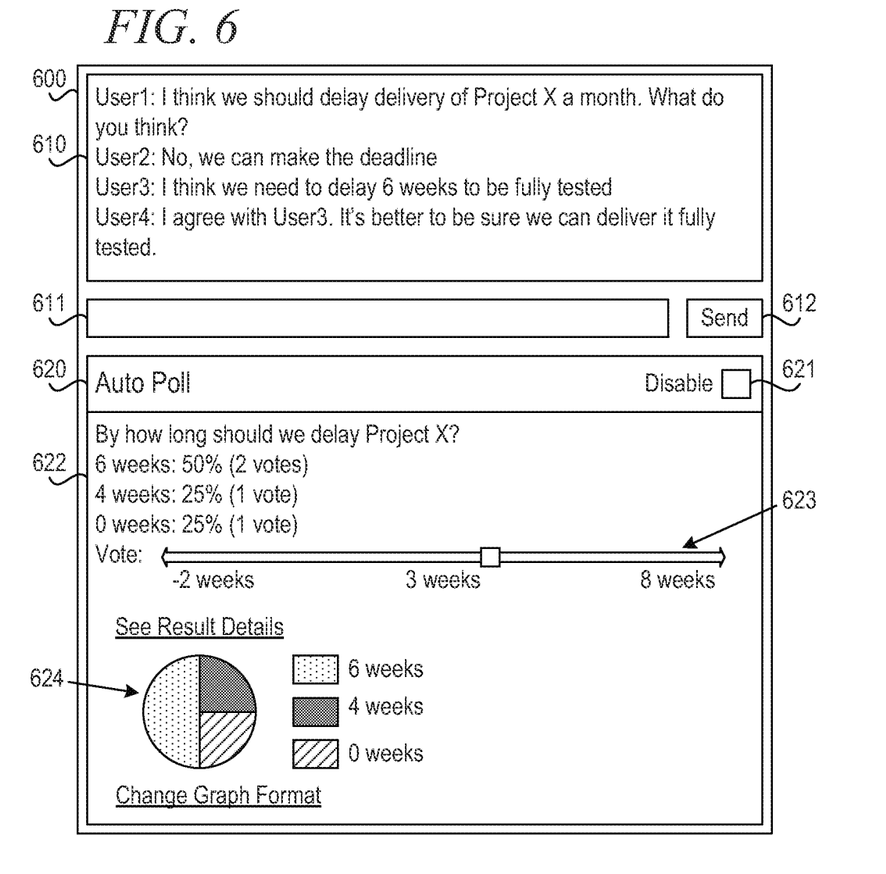
FIG. 6 is an example poll user interface incorporated into an electronic meeting environment in accordance with an illustrative embodiment.

The mechanisms of the illustrative embodiments may apply to other communication systems, such as email, text messages, etc., where the system can monitor questions and answers in multiple user communications. FIG. 6 is an example poll user interface incorporated into an electronic meeting environment in accordance with an illustrative embodiment. Electronic meeting user interface 600 includes chat interface 610 and automatic polling interface 620. Chat interface 610 includes a chat content portion that presents each message labeled with a user identifier of the user who entered the message. Chat interface 610 also includes message entry portion 611 and send control 612. A user enters a chat message into message entry portion 611 and selects control 612 to send the message to the chat system.

Automatic polling interface 620 includes a disable control 621 that is selectable by the user to disable automatic polling in the electronic meeting user interface 600. Automatic polling interface 620 includes poll results 622 and answer selection control 623. In the depicted example, answer selection control 623 is a slider that allows the user to select an answer between negative two weeks and eight weeks. Automatic polling interface 620 also includes a graphical poll results portion 624 that presents the poll results in a chart or graph. In this example, the graphical poll results portion 624 presents the poll results in a pie chart.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Figure 7:
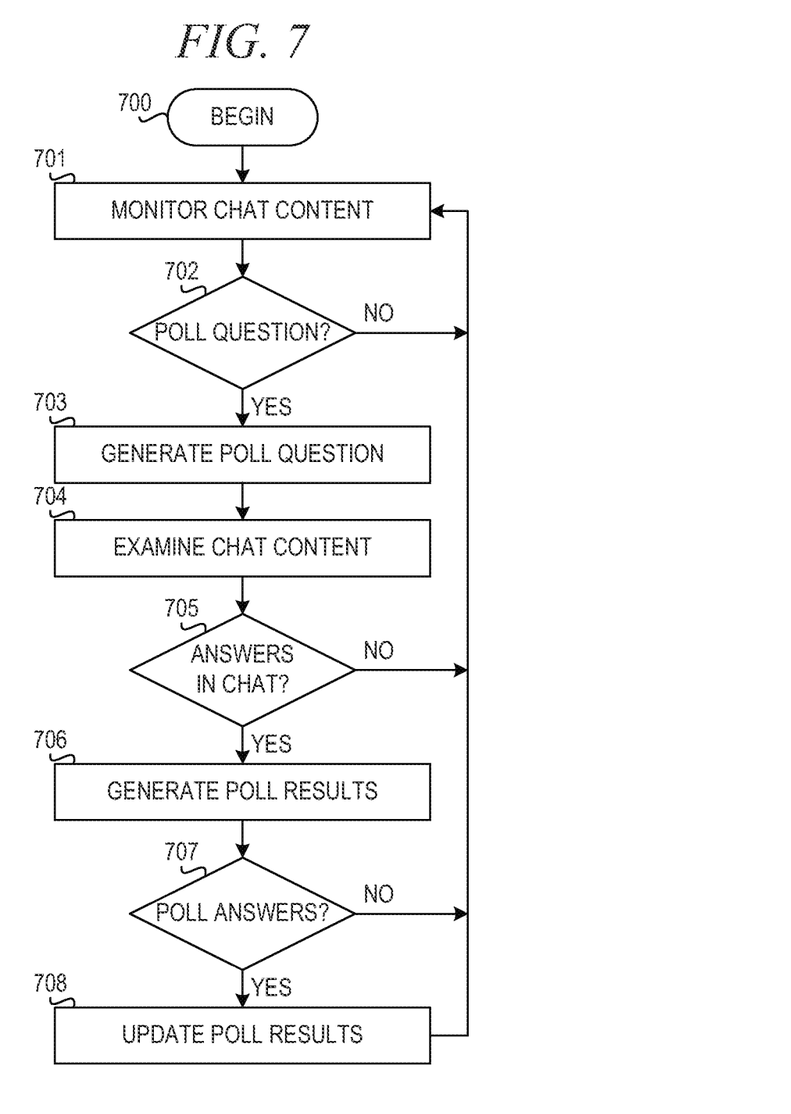
FIG. 7 is a flowchart illustrating operation of a mechanism for generating poll information from a chat session in accordance with an illustrative embodiment.

FIG. 7 is a flowchart illustrating operation of a mechanism for measuring authority of a document source of an answer to a question in accordance with an illustrative embodiment.

Operation begins (block 700), and the mechanism monitors chat content (block 701). The mechanism determines whether the chat content contains a poll question (block 702). If the chat content does not contain a poll question, operation returns to block 701 to monitor the chat content.

If the chat content contains a poll question in block 702, the mechanism generates a poll question in the chat user interface (block 703). The mechanism examines chat content for answers to the poll question (block 704). The mechanism determines whether answers to the poll question appear in the chat session (block 705). If no answers to the poll question appear in the chat, operation returns to block 704 to examine the chat content.

If answers to the poll question appear in the chat session in block 705, the mechanism generates poll results (block 706). The mechanism then determines whether users provide further poll answers (block 707). Users may provide answers to the poll question within the chat itself or by voting on the poll in the poll user interface. If users provide no further poll answers, then operation returns to block 701 to monitor the chat content. If users provide further poll answers in block 707, then the mechanism updates the poll results (block 708). Thereafter, operation returns to block 701 to monitor the chat content.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art without departing from the scope and spirit of the described embodiments. The embodiment was chosen and described in order to best explain the principles of the invention, the practical application, and to enable others of ordinary skill in the art to understand the invention for various embodiments with various modifications as are suited to the particular use contemplated. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, in a data processing system comprising a processor and a memory, the memory comprising, instructions executed by the processor to specifically configure processor to implement a poll generation system for generating poll information from a chat session, the method comprising:

monitoring, by the poll generation system, chat content in the multiple user chat session;

analyzing, by a question analysis component executing within the poll generation system, syntax and semantic structure of a given text message from a questioning user in the multiple user chat session to determine that the given text message contains a question;

determining, by the question analysis component, that the question is a poll question based on a question type of the question;

identifying, by an answer analysis component executing within the poll generation system, a plurality of answers to the poll question in subsequent text messages from a plurality of answering users within the chat content;

generating, by a poll generation component executing within the poll generation system, a poll user interface presenting the poll question and the plurality of answers as selectable options; and presenting, by the poll generation system, the poll user interface to the multiple users of the chat session.

2. The method of claim 1, further comprising:

collecting responses to the poll question;

generating poll results based on the collected responses; and presenting the poll results to the multiple users of the chat session.

3. The method of claim 2, wherein collecting the responses comprises identifying responses to the poll question within text messages in the chat content.

4. The method of claim 2, wherein collecting the responses comprises receiving user selections from the poll user interface.

5. The method of claim 2, wherein presenting the poll results comprises presenting a graph or chart representing the poll results.

6. The method of claim 2, wherein generating the poll results comprises determining a weight for each response to the poll question to form weighted responses and determining a consensus based on the weighted responses.

7. The method of claim 6 where the weights are determined based on a learned statistical model, user provided active feedback, or a combination of a learned statistical model and user provided active feedback.

8. The method of claim 1, wherein determining whether the question is a potential poll question comprises determining whether the question has a finite number of distinct answers, whether the question asks about future events, or whether the question asks for sentiment from the multiple users.

9. The method of claim 1, wherein identifying the plurality of answers to the poll question comprises:
   determining a confidence score for each subsequent text message, wherein the confidence score represents a probability the subsequent text message correctly answers the poll question; and
   responsive to determining that the confidence score for a given subsequent text message is greater than a predetermined threshold, identifying the given subsequent text message as an answer to the poll question.

10. The method of claim 1, wherein identifying the plurality of answers to the poll question comprises determining whether each subsequent text message answers the poll question based on a context of the chat session.

\* \* \* \* \*